(12) United States Patent
Oh

(10) Patent No.: US 7,586,051 B2
(45) Date of Patent: Sep. 8, 2009

(54) SWITCH ASSEMBLY FOR VEHICLE

(75) Inventor: Young Sub Oh, Suwon-si (KR)

(73) Assignee: Kia Motors Corporation, Seoul (KR)

( * ) Notice: Subject to any disclaimer, the term of this patent is extended or adjusted under 35 U.S.C. 154(b) by 66 days.

(21) Appl. No.: 11/972,379

(22) Filed: Jan. 10, 2008

(65) Prior Publication Data
US 2009/0107822 A1 Apr. 30, 2009

(30) Foreign Application Priority Data
Oct. 31, 2007 (KR) .................. 10-2007-0110188

(51) Int. Cl.
*H01H 9/26* (2006.01)
(52) U.S. Cl. .................. 200/5 R; 200/18
(58) Field of Classification Search .............. 200/5 R, 200/18, 17 R, 339, 343, 4
See application file for complete search history.

(56) References Cited

U.S. PATENT DOCUMENTS

| | | | | |
|---|---|---|---|---|
| 4,551,660 A | * | 11/1985 | Suzuki | 318/293 |
| 4,831,349 A | * | 5/1989 | Hirose et al. | 335/186 |
| 4,876,493 A | * | 10/1989 | Suzuki | 318/293 |
| 5,534,842 A | * | 7/1996 | Nagayama et al. | 337/402 |
| 5,898,392 A | * | 4/1999 | Bambini et al. | 340/996 |
| 6,729,683 B2 | * | 5/2004 | Kreiner et al. | 296/223 |
| 6,891,114 B2 | * | 5/2005 | Peterson | 200/17 R |
| 7,180,018 B2 | * | 2/2007 | Sekino et al. | 200/5 A |
| 7,238,905 B2 | * | 7/2007 | Oh | 200/339 |
| 7,439,460 B1 | * | 10/2008 | Watson | 200/5 R |

* cited by examiner

*Primary Examiner*—Michael A Friedhofer
*Assistant Examiner*—Lisa N Klaus
(74) *Attorney, Agent, or Firm*—Morgan, Lewis & Bockius LLP

(57) ABSTRACT

A sunroof switch assembly for a vehicle includes a switch housing, a push switch, a first tilting switch, and a second tilting switch. The switch housing is installed in a cabin of the vehicle and has a plurality of contacts for respective operations of a sunroof. The push switch is mounted to the switch housing. The first tilting switch is mounted to the switch housing by the medium of a first hinge part, which is located adjacent to one side of the push switch. The second tilting switch is mounted to the switch housing by the medium of a second hinge part, which is located adjacent to the other side of the push switch.

9 Claims, 3 Drawing Sheets

SWITCH ASSEMBLY FOR VEHICLE

CROSS-REFERENCE TO RELATED APPLICATIONS

This application claims priority to Korean Application No. 10-2007-0110188, filed on Oct. 31, 2007, the disclosure of which is incorporated herein by reference.

BACKGROUND OF THE INVENTION

1. Field of the Invention

The present invention relates to a sunroof switch assembly for a vehicle, and more particularly to a switch assembly for operating a sunroof.

2. Description of the Prior Art

A sunroof switch is provided in a vehicle to automatically open and close a sunroof. A conventional sunroof switch has a structure in which a knob is manipulated back and forth to open or close a sunroof, or a seesaw type structure.

However, a drawback with conventional sunroof switches, is that they can be inadvertently activated, potentially closing the sunroof, and injuring a person who is extending a body part through the opening.

The information disclosed in this Background of the Invention section is only for enhancement of understanding of the background of the invention and should not be taken as an acknowledgement or any form of suggestion that his information forms the prior art that is already known to a person skilled in the art.

SUMMARY OF THE INVENTION

Embodiments of the present invention provide a sunroof switch assembly for a vehicle which can prevent advertent operation for example the sunroof being closed when the switch is inadvertently pushed by the elbow of a child.

According to an exemplary embodiment of the present invention, a sunroof switch assembly for a vehicle includes a switch housing, a push switch, a fast tilting switch, and a second tilting switch. The switch housing is installed in a cabin of the vehicle and has a plurality of contacts for respective operations of a sunroof. The push switch is mounted to the switch housing. The first tilting switch is mounted to the switch housing by the medium of a first hinge part which is located adjacent to one side of the push switch. The second tilting switch is mounted to the switch housing by a second hinge part which is located adjacent to the other side of the push switch.

The push switch can comprise a closing switch for closing the opened sunroof. The first tilting switch can comprise a tilting switch for tilting the sunroof, and the second tilting switch can comprise an opening switch for opening the sunroof. The push switch can be actuated to close the sunroof when it is pushed to a position that is lower than upper surfaces of the first hinge part and the second hinge part. The projecting height of the push switch, that is, the height that it projects from the upper surfaces of the first hinge part and the second hinge part, can be less than the distance between the push switch and a corresponding contact.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

Figure 1:
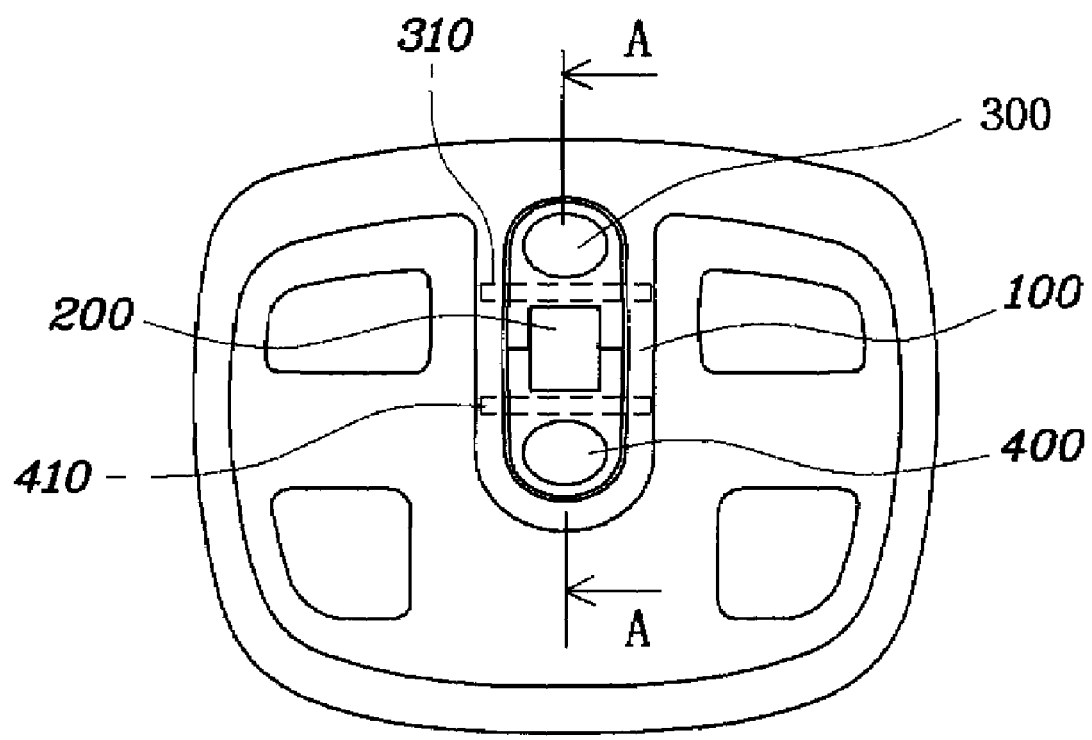
FIG. 1 is a plain view illustrating a sunroof switch assembly for a vehicle in accordance with an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent pans of the present invention throughout the several figures of the drawing.

DETAILED DESCRIPTION OF THE INVENTION

Reference will now be made in detail to a exemplary embodiments of the present invention an example of which is illustrated in the accompanying drawings and described below. While the invention will be described in conjunction with exemplary embodiments, it should be understood that the description is not intended to limit the invention to the exemplary embodiments. On the contrary, the invention is intended to cover not only the exemplary embodiment, but also various alternatives, modifications, equivalents and other embodiments, which may be included within the spirit and scope of the invention as defined by the appended claims. In particular, while exemplary embodiments are described in connection of a sunroof, it will be readily appreciated that the invention may be applied to other operable members that close openings in the vehicle cabin.

Figure 2:
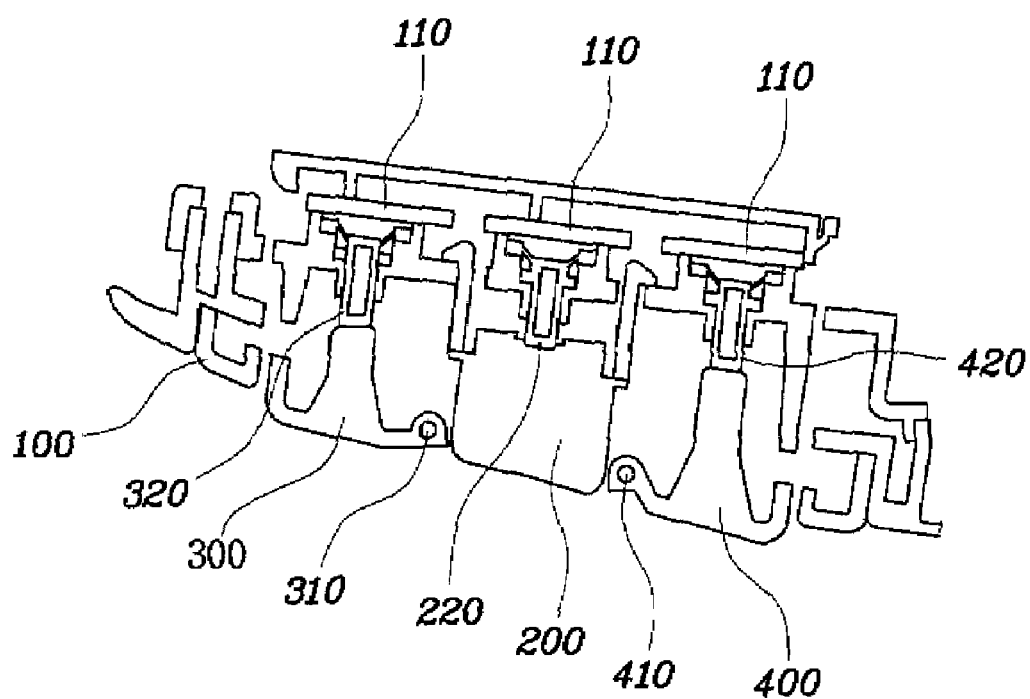
FIG. 2 is a cross-sectional view taken along the line A-A of FIG. 1.

Referring to FIGS. 1 and 2, a sunroof switch assembly for a vehicle in accordance with an embodiment of the present invention includes a switch housing 100 and a push switch 200 mounted to the switch housing 100. A first tilting switch 300 is installed through a first hinge part 310 on one side of the push switch 200, and a second tilting switch 400 is installed through a second hinge part 410 on the other side of the push switch 200.

The switch housing 100 is arranged in the cabin of the vehicle and has contacts 110 for operating a sunroof. The plurality of switches thus provided are brought into electrical contact with respective contacts 110 to allow the sunroof to be operated.

In particular, the push switch 200, which is manipulated by being pushed, is located at the middle portion of the switch housing 100. The first tilting switch 300 and the second tilting switch 400, which are manipulated by being tilted, are respectively located on opposite sides of the push switch 200.

The push switch 200 has a connection terminal 220, which is brought into electrical connection with the contact 110 when it is pushed. The push switch 200 may comprise a closing switch for closing the opened sunroof when the connection terminal 220 is brought into electrical connection with the contact 110.

The push switch 200 projects a predetermined height from the switch housing 100. The predetermined height may be set to be less than the distance between the contact 110 and the connection 220 of the push switch 200. In this regard, the contact 110 and the connection terminal 220 may be separated from each other by a distance no less than 2 mm, and that the projecting height of the push switch 200 be set higher than the upper surfaces of the first hinge part 310 and the second hinge part 410 by about 1 mm or less.

Figure 3:
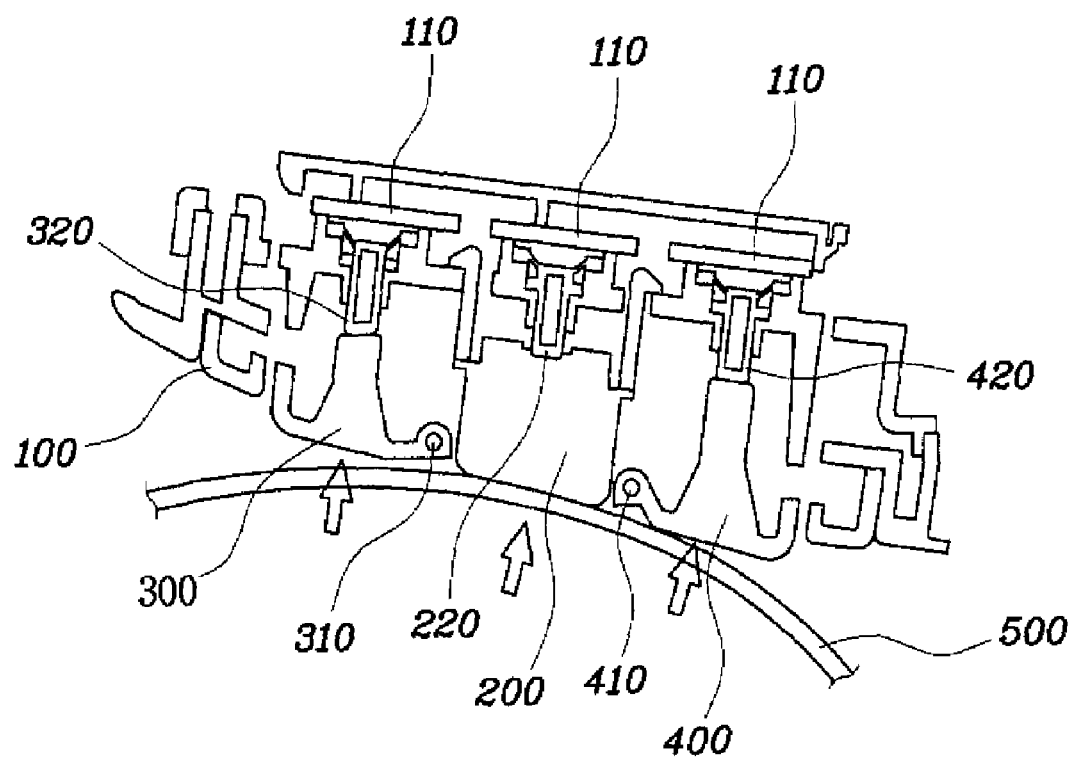
FIG. 3 is a cross-sectional view illustrating the state in which the sunroof switch assembly for a vehicle according to an embodiment of the present invention is pushed by a rounded part.

Referring to FIG. 3, when the push switch 200 is inadvertently pushed by a large or rounded object 500, such as the palm of a hand or the elbow of a child, the sunroof may be prevented from closing as described below as to prevent a human body from being injured due to the closing of the sunroof.

The push switch 200 is located between the first tilting switch 300 and the second tilting switch 400 and is thus sandwiched between the first tilting switch 300 and the second tilting switch 400. The first tilting switch 300 is located on one side of the push switch 200 and has a connection terminal 320 which can be brought into electrical connection with the corresponding contact 110. The connection terminal 320 can be brought into electrical connection with the corresponding contact 110 of the switch housing 100 through the tilting operation of the first tilting switch 300. The fir tilting switch 300 may comprise a tilting switch for tilting the sunroof when the connection terminal 320 is brought into electrical connection with the contact 110.

The tilting operation of the first tilting switch 300 is implemented through the fist hinge part 310. The first hinge part 310 can comprise a rotation pin, both ends of which are supported by the switch housing 100. The first hinge part 310 is located adjacent to one side of the push switch 200 and serves as a rotation shaft for the tilting operation of the first tilting switch 300. Also, the first hinge part 310 is installed on the edge of the first tilting switch 300 adjacent to the push switch 200 and serves as a support shaft.

The second tilting switch 400 is located on the other side of the push switch 200 and has a connection terminal 420 which can be brought into electrical connection with the corresponding contact 110. The connection terminal 420 can be brought into electrical connection with the corresponding contact 110 of the switch housing 100 through the tilting operation of the second tilting switch 400. The second tilting switch 400 may comprise an opening switch for opening the sunroof when the connection terminal 420 is brought into electrical connection with the contact 110.

The tilting operation of the second tilting switch 400 is implemented through the second hinge part 410. The second hinge part 410 is located adjacent to the other side of the push switch 200 and serves as a rotation shaft for the tilting operation of the second tilting switch 400. To this end, the second hinge part 410 can comprise a rotation shaft both ends of which are supported by the switch housing 100.

The second hinge part 410 is installed on the edge of the second tilting switch 400 adjacent to the push switch 200. Thus, the second hinge part 410 can cooperate with the first hinge part 310 to serve as a support shaft which can restrain the amount that the push switch 200 is pushed when the push switch 200 is inadvertently pushed by a large or rounded object such as the palm of a hand or the elbow of a child.

As is apparent from the above description, the present invention provides advantages in that, since the hinge shafts of tilting switches prevent a closing switch from being inadvertently manipulated by the elbow of a child, it is possible to prevent the child from being injured by a closing sunroof.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A switch assembly for a vehicle, comprising:
   a switch housing installed in a cabin of the vehicle and having a plurality of contacts for respective operations of an operable member for closing an opening in the cabin;
   a push switch mounted to the switch housing;
   a first tilting switch mounted to the switch housing via a first hinge part which is located adjacent to a first side of the push switch; and
   a second tilting switch mounted to the switch housing via a second hinge part which is located adjacent to a second side of the push switch.

2. The switch assembly according to claim 1, wherein the push switch comprises a closing switch for closing the operable member.

3. The switch assembly according to claim 2, wherein the first tilting switch comprises a tilting switch for tilting the operable member, and the second tilting switch comprises an opening switch for opening the operable member.

4. The switch assembly according to claim 3, wherein the push switch is actuated and closes the operable member when it is pushed to a position that is lower than upper surfaces of the first hinge part and the second hinge part.

5. The switch assembly according to claim 3, wherein a projecting height of the push switch, which projects from an upper surface of the first hinge part and the second hinge part, is less than a distance between the push switch and a corresponding contact.

6. The switch assembly according to claim 2, wherein the push switch is actuated and closes the operable member when it is pushed to a position that is lower than upper surfaces of the first hinge part and the second hinge part.

7. The switch assembly according to claim 2, wherein a projecting height of the push switch, which projects from an upper surface of the first hinge part and the second hinge part, is less than a distance between the push switch and a corresponding contact.

8. The switch assembly of claim 1, wherein the operable member is a sunroof.

9. The switch assembly of claim 1, wherein said first and second tilting switches cooperate to limit depression of said push switch when all switches are depressed simultaneously.

* * * * *